May 2, 1939.   K. E. WHITNEY   2,156,325
WHEEL SCALE
Filed April 16, 1935   6 Sheets-Sheet 1

Inventor
Kenneth E. Whitney
By Edwin T. Samuels
Attorney

Witnesses

May 2, 1939. K. E. WHITNEY 2,156,325
WHEEL SCALE
Filed April 16, 1935 6 Sheets-Sheet 3

Inventor
Kenneth E. Whitney
By Edwin F. Samuels
Attorney

Witnesses

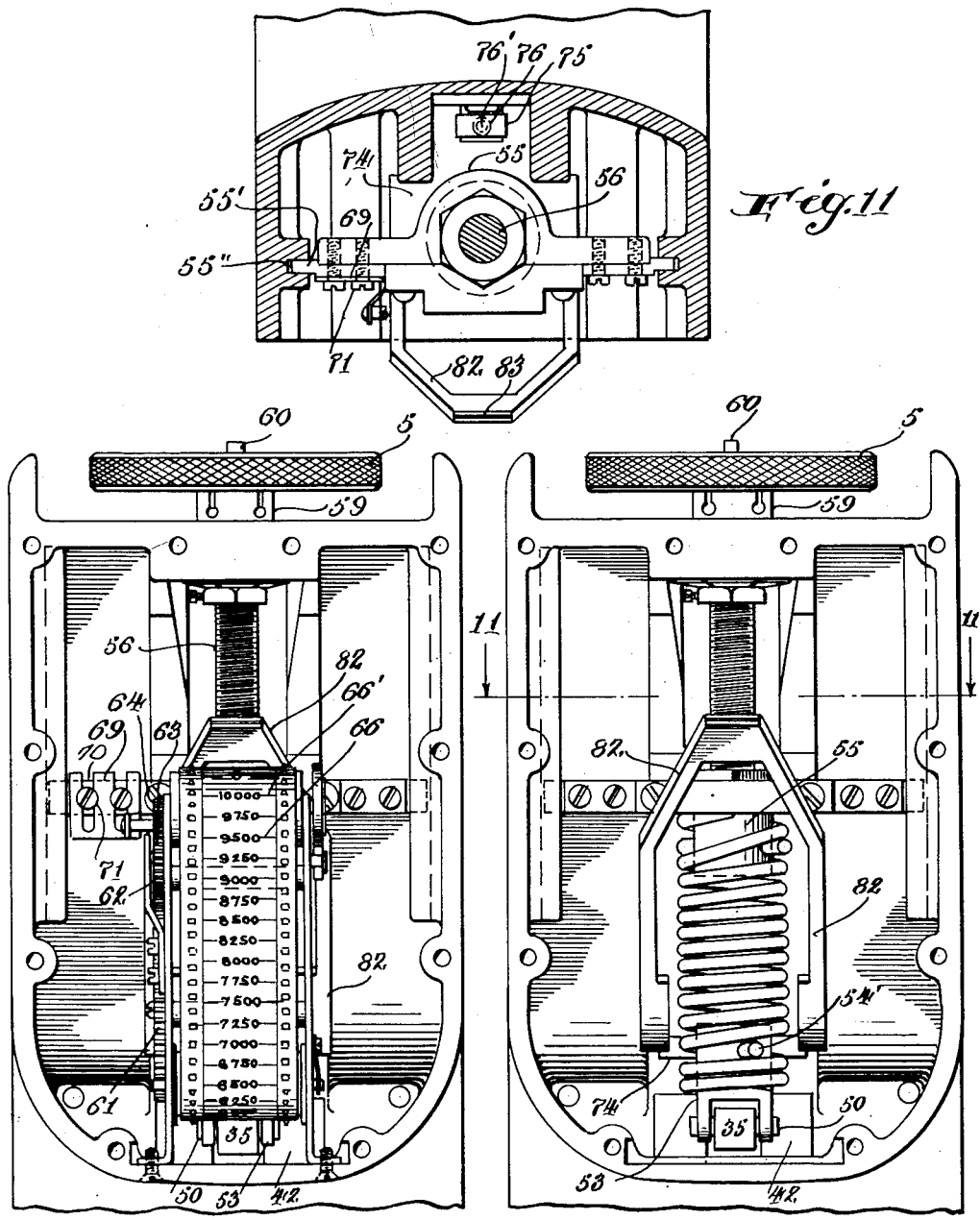

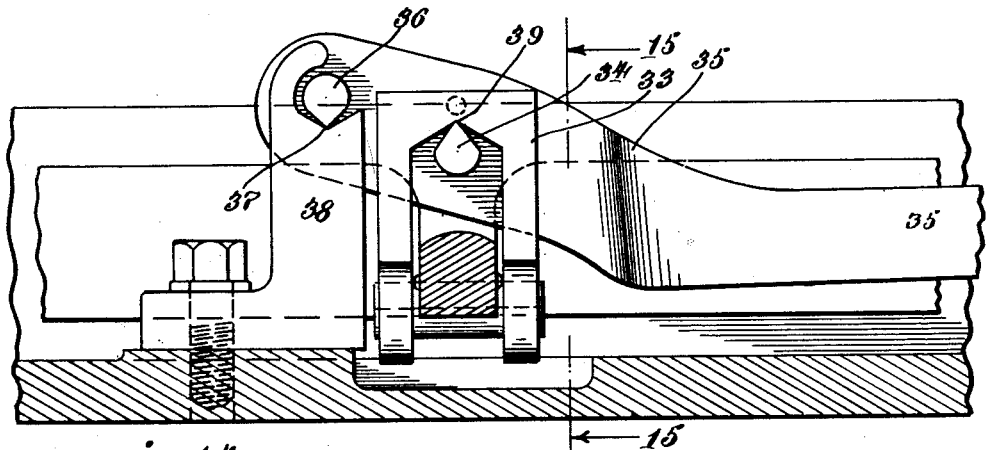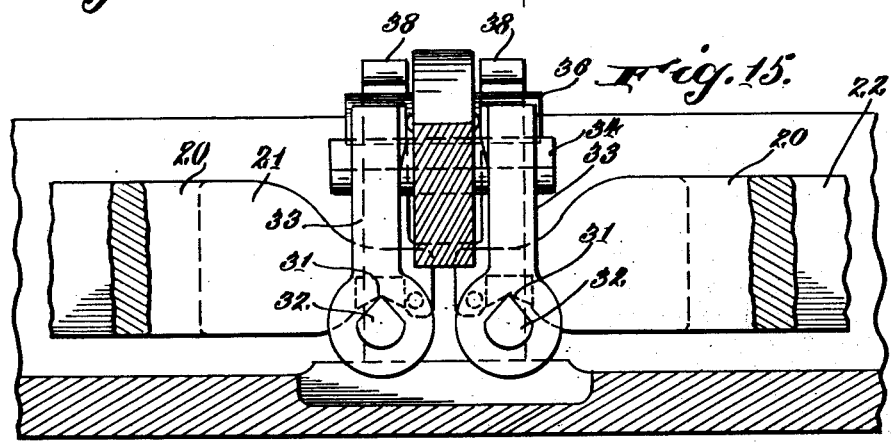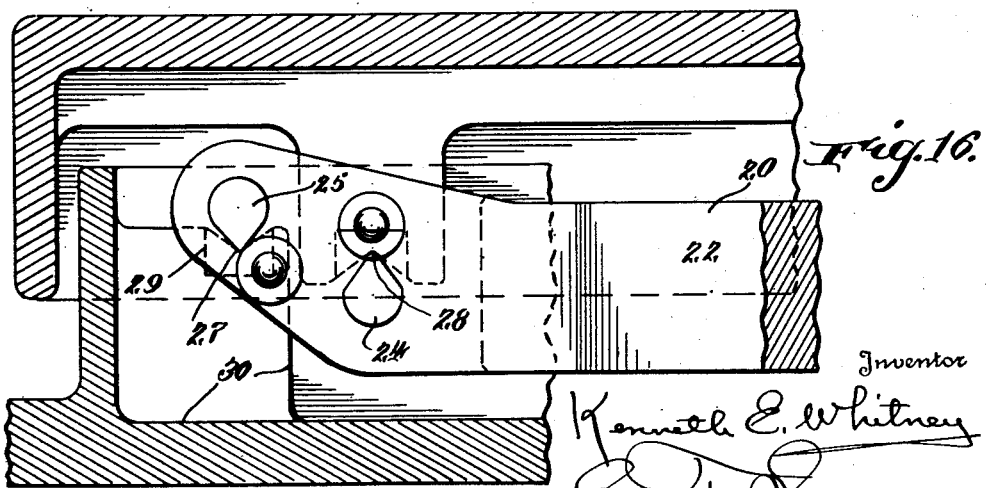

Patented May 2, 1939

2,156,325

UNITED STATES PATENT OFFICE 2,156,325

WHEEL SCALE

Kenneth E. Whitney, Towson, Md., assignor to The Black & Decker Manufacturing Company, Towson, Md., a corporation of Maryland Application April 16, 1935, Serial No. 16,565

10 Claims. (Cl. 265—68)

The object of the invention is to produce a weighing device or scale preferably of the platform type, adapted to weigh the heaviest vehicles which run on the highways, and also adapted for use in weighing airplanes as well as road vehicles. The apparatus, while it is of the capacity outlined, if of increased accuracy and reliability as compared to the earlier appliances in weighing both large and small loads, and sufficiently light to be easily transported in a light motor vehicle or motor cycle side car and so easily handled that it can be instantly removed from the transport vehicle by hand by one man and placed on the road or other surface whereon the wheels to be weighed are supported, so that a wheel of the motor vehicle truck or air plane can be run on to the platform for weighing. This apparatus is well adapted for use by inspectors and other government officials for weighing air planes in the enforcement of the laws as to loading passenger and transport planes as to which the provisions of the law are specific and strictly enforced, and it is also of advantage for use by state authorities and motor cycle police or others in authority in weighing truck-loads and determining bearing pressure per unit of tire width and the like, making it easy and convenient to weigh and test the loads on the road without the delay and annoyance incident to deflecting the vehicle from its intended course in order to weigh it on a stationary scale and without the labor, loss of time and hazard incident to lifting a heavy vehicle by means of a weighing jack. The scale is also adapted for use in determining tire sizes, etc.

A further and more particular object of the invention is to so improve this type of road scale as to avoid the errors and the necessity for correction incident to change of angularity of the platform levers or beams and/or scale beam and contraction, expansion and deflection of the same due to change of temperature and other conditions, at the same time avoiding the necessity for correction incident to a hydraulic or similar scales, such errors being due to the contraction and expansion of the hydraulic fluid, change of temperature, loss of pressure due to leakage and in some instances the friction of a hydraulic piston. The improvement of the invention combines the advantages of a hydraulic scale with those of a lever scale, avoiding the errors and corrections incident to both, producing a portable scale of the accuracy required of stationary platform scales.

An important result of the invention is that weighing is accomplished with the platform in the initial position, which corresponds to the zero reading of the scale and the balanced position of the beam, and hence without deflection at the time of reading the weight of the weighing beam and platform supporting levers or beams from balanced position, thus avoiding errors due to angularity of the scale beam and platform beams or levers. It is also important to note that the apparatus performs the weighing function without in any way utilizing the load, i. e., the potential energy due to the position of the load, or the power incident to yielding in response to the load in operating the indicator, the work necessary to operate the indicator being performed by hand in balancing the scale lever against the load, thus avoiding the error incident to expenditure of the energy of the load in this way. It is to be further noted that the result of weighing being in no wise dependent upon the balancing effect of weights, as to which the error due to angularity of the motion of said weights with the vertical would be many times multiplied, the position of the scale in its relation to a horizontal plane is less important than in other beam scales.

In the operation of the improved scale in the preferred form shown, the motion of the platform is less than ½ of .001", the motion of the weighing beam being limited to $\frac{1}{16}$". The deflection of the beam is in the weighing operation balanced and overcome by increasing the tension of a spring, the expansion of which is measured in determining the load so that there is no deflection of the beam or displacement of the platform at the time of weighing, both having been at this time returned to initial position by increased tension of the indicating spring. In this way all of the advantages of the hydraulic scale which measures by determining increase of pressure and the beam scale which measures the load by balancing a beam by means of weights, are retained and important errors incident to both types of scale and the necessity for correction on account of these errors are avoided.

One of the important problems involved in the production of a platform scale, with the spring balanced beam, having the capacity required for weighing trucks and aeroplanes and being at the same time of the small size and weight essential to ease and freedom of handling in use, is that incident to accurate balancing of the beam and hence to the necessary degree of precision in weighing. This difficulty has been overcome, and an instrument meeting all requirements, and capable of greater accuracy than has been previously attained with any instrument of this size and capacity has been produced by combining with the necessarily short beam an arrangement of stops, or the like, whereby the motion of the beam and platform is so limited that they are almost stationary and a balance indicator which in operation multiplies the short motion or tendency to motion of the beam many times over, giving extremely precise indication of the balance point before and after loading. By accurately measuring the change of spring deflection between these two conditions of balance, great precision in weighing is attained.

In the accompanying drawings I have illustrated a portable road scale or road bearing pressure meter embodying the features of my invention in the preferred form.

In the drawings:

Figure 9 is an elevation of the indicator belt, micrometer screw and the closely related parts, the same being shown with the cover of the indicator housing removed.

Figure 10 is a similar view with the indicator belt and gears, etc. removed to disclose the indicating spring and the underlying parts.

Figure 11 is a section on the line 11, 11 in Figure 10.

Figure 14 is a fragmentary elevation of the inner end portion of the weighing beam by which the load on the platform is communicated to the indicator, the view also including the knife edge on which this beam is supported and the knife edge seated in the beam, by which the load on the platform is communicated to this lever by the platform levers or beams. The view is taken from line 14, 14 in Figure 4.

Figure 15 is a section on the line 15, 15 in Figure 14 looking from the right and showing the platform beam ends in connection with the weighing beam.

Figures 4, 5:
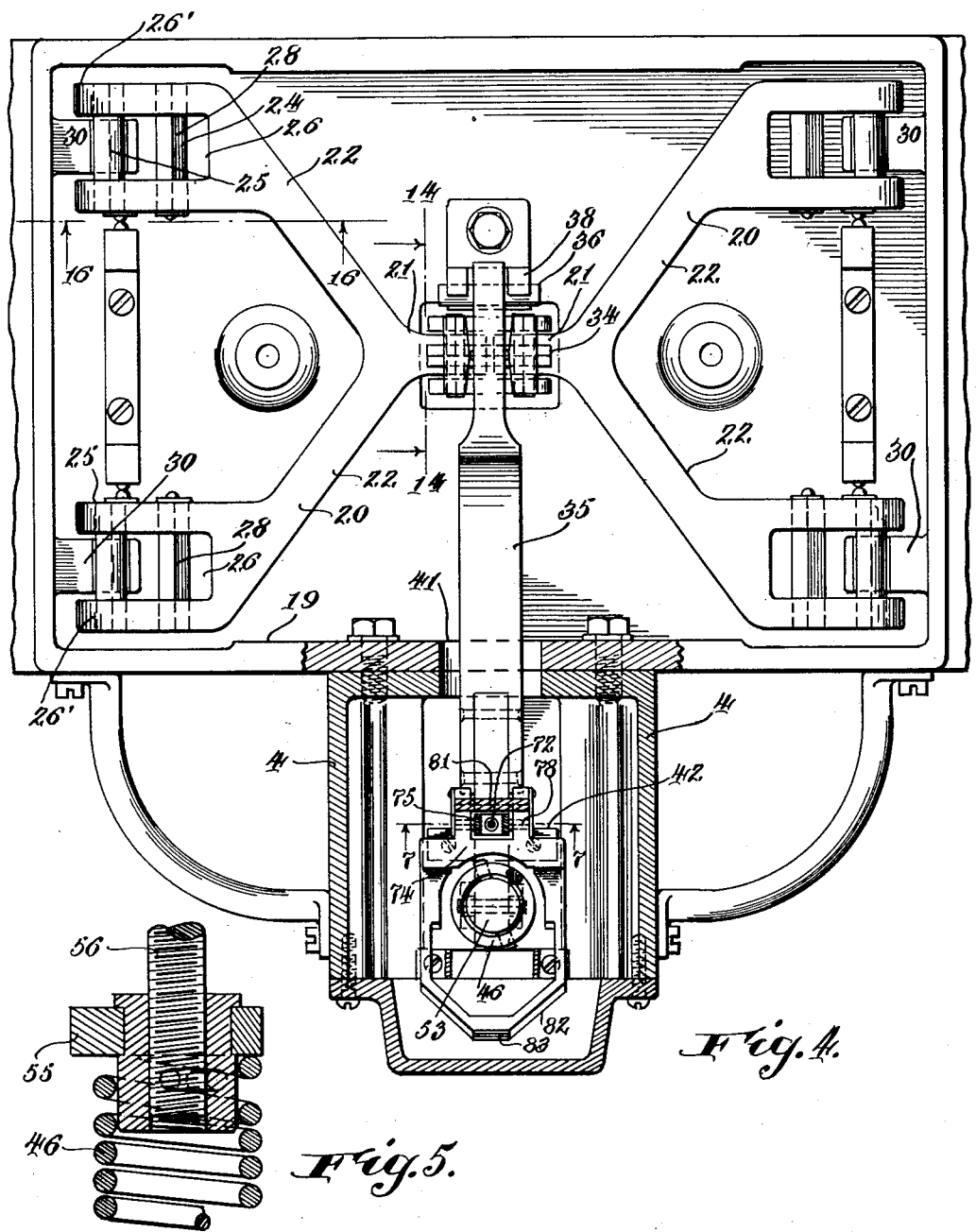
Figure 4 is a plan view partly in section on the line 4, 4 in Figure 2, the platform being removed to disclose the lever system by which it is supported.
Figure 5 is a fragmentary section of the indicator spring for balancing the lever, also including the micrometer screw and nut.
Figure 6:
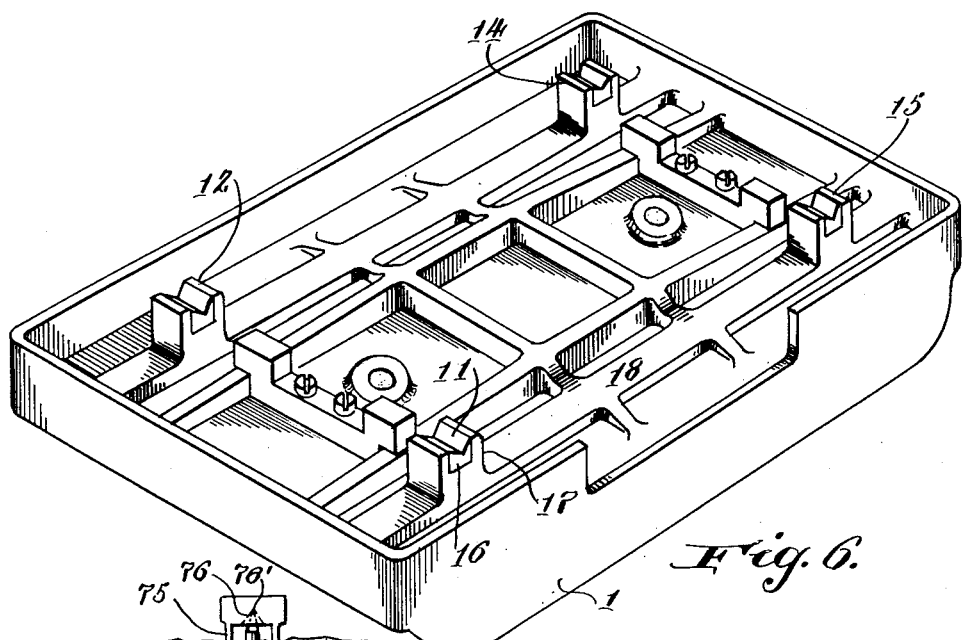
Figure 6 is a perspective view of the platform removed and inverted.

Figure 16 is a fragmentary elevation of one of the platform beams including the knife edges on which the same is supported and the knife edges at one end of the platform by which the load on the platform and the weight thereof is communicated to this lever, the platform being in section on line 16, 16 in Figure 4.

Figure 1:
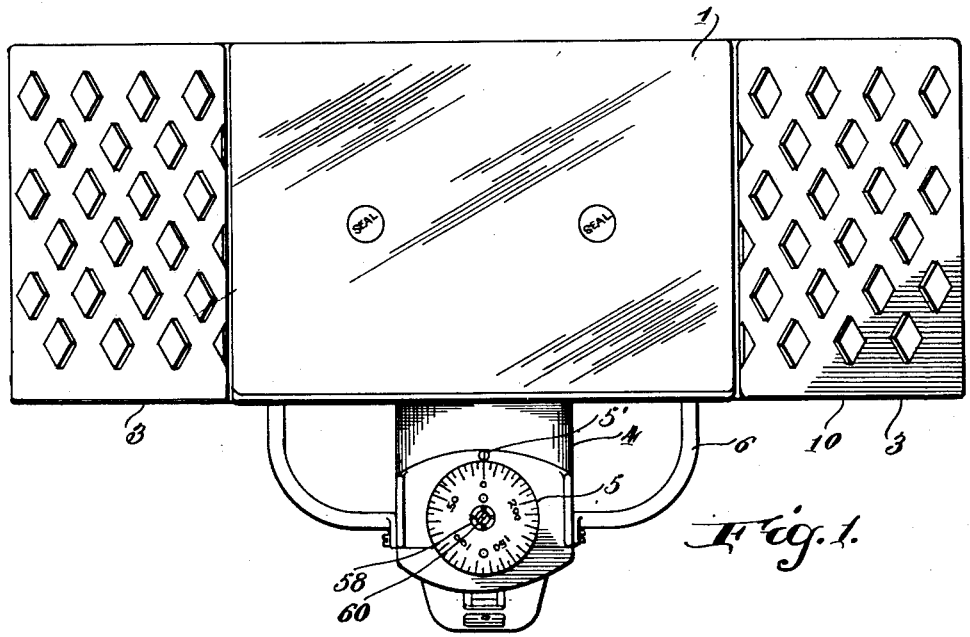
Figure 1 is a top plan view of the apparatus assembled.
Figure 2:
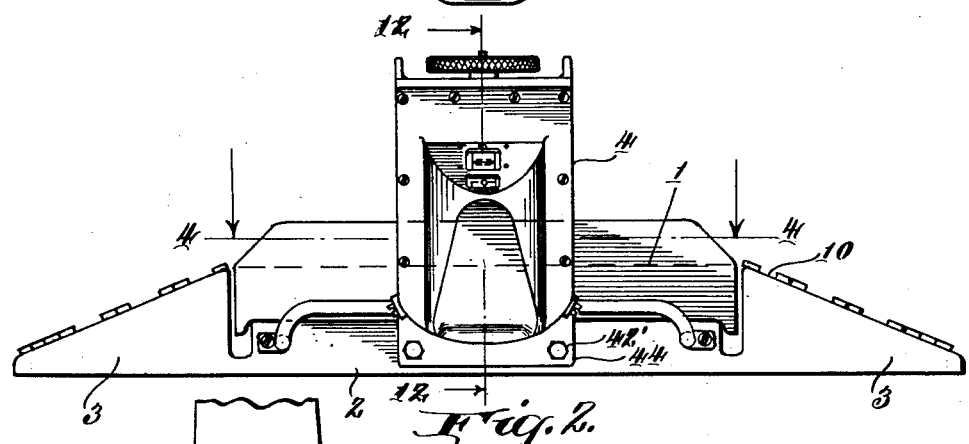
Figure 2 is a side elevation of the same looking from the front where the indicator is located.
Figure 3:
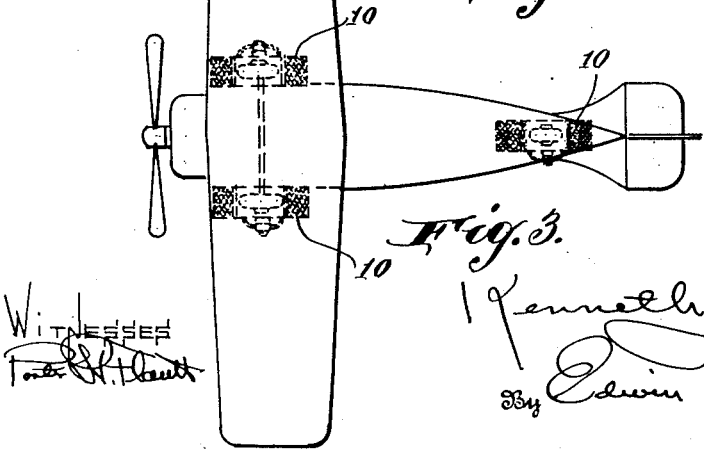
Figure 3 is a fragmentary top plan view of an airplane in weighing position, three of the portable platform scales of the invention being employed in this instance, one supporting each wheel of the plane.

Referring to the drawings by numerals, each of which is used to indicate the same or similar parts in the different figures, the portions of the structure which are apparent in Figures 1 and 2 consist of the platform 1, the base or support 2, the ramps 3, which are shown integral with the base, the indicating housing 4, the spring takeup dial 5 and lateral support 6 for the indicator housing. The weighing instrument, as a whole, is indicated by reference character 10.

Having reference now to Figures 4, 6, 14, 15 and 16, the platform 1 is preferably of a width to receive a single wheel of the vehicle to be weighed. This platform is shown in perspective and in inverted position in Figure 6. The platform as shown is provided with four downwardly disposed knife edge engaging sockets or knife edge engaging bearing members 11, 12, 14 and 15, adjacent and spaced within each corner of the platform. Each of these knife blade sockets is formed in a suitable block 16 of suitable hardness which is seated in a corresponding projection 17, integral with and extending downwardly from reinforcing ribs 18 which are cast integrally with the platform. Beneath the platform located in a suitable enclosure 19 in the frame, which enclosure is open at the top to receive the platform, are two platform supporting beams or levers 20, it being understood that the details being described relate merely to the preferred form, and are capable of wide variation. These platform beams are shown as bifurcated, each having a load transmitting shank 21 and two diverging arms 22. Each of these arms is in turn bifurcated or formed with jaws 26' and provided with two oppositely disposed knife edge members 24, 25 crossing the space 26 between the jaws or bifurcations 26'. In the normal position of these levers the outer knife edge members 25 have their edges 27 downwardly disposed, see Figure 16, and the inner knife members 24 have their edges 28 upwardly disposed. The knife edges 27 of knife edge members 25 engage corresponding knife edge sockets 29 supported in the upper surfaces of knife edge supporting blocks 30 formed in the housing or chamber 19 near each corner and the knife edges 28 of knife edge members 24, which are disposed upwardly engage each the corresponding socket of the four platform sockets 11, 12, 14, 15, Figure 6. Knife edges 27 serve as the fulcrums of the platform beams 20. The load transmitting shanks 21 at the inner ends of the platform supporting beams 20 are provided each of them with a downwardly disposed knife edge socket bearing block 31, seated or inserted in the inner end of the lever after the manner of the other inserts, 16, Figure 6, and each of these is engaged by an upwardly disposed knife edge 32, see Figure 15. Each of said knife edges 32 is carried by a corresponding yoke 33 and these yokes are in turn supported on a knife edge 34. This latter knife edge is upwardly disposed and extends transversely through the weighing beam 35 in which it is secured near the fulcrum of the beam but spaced therefrom in the direction of the lever arm. The beam 35 is also provided with a transverse downwardly disposed knife edge 36 secured therein and extending transversely through the beam 35 at its fulcrum end and engaging knife edge sockets 37 on each side of the beam 35 in a bifurcated block 38 which is shown as secured to the frame in any suitable manner. This knife edge 36 serves as the fulcrum of the weighing beam. It will be noted that the U shaped members or yokes 33 have downwardly disposed knife edge sockets 39 engaging the knife edges 34. Also it is noted that the fulcrum knife edge 36 and the load supporting knife edge 34 are closely related. The slight motion resulting from the application of the load would be multiplied and the pressure at the end of the lever due to the load correspondingly reduced.

The weighing beam 35 projects laterally through a suitable opening 41 in the wall of the chamber 19 and into the indicator housing 4. This indicator housing 4 is shown as provided with a stop 42 for limiting the upward motion of the weighing beam 35, the floor or bottom of the housing at 43 serving as a stop to limit the downward motion of the beam, the spacing of these stops from the lever in the normal position shown being preferably about $\frac{1}{32}''$ and being somewhat exaggerated in the illustration for convenience to avoid obscurity of the drawing.

This extremely short motion of the weighing beam at the indicating end is reduced as transmitted to the platform by the ratio of the respective arms of this beam and the ratio of the platform beams. Under these circumstances the maximum motion of the platform, corresponding to this swing of the lever, is about ½ of .001". In these circumstances the indicating mechanism is entirely relieved of shock incident to the placing of the load on the platform as there is practically no motion of the parts to be transmitted to this mechanism and for all practical purposes the lever mechanism, knife edges, etc., are also relieved of any and all such shock. The close limitation of the motion of the spring balanced beam so that it is practically stationary, and the provision of the balance indicator hereinafter described whereby the motion of the beam is widely multiplied are of great importance and effect in making possible the production of a small portable scale of the high capacity and of the extreme accuracy necessary in the inspection of road vehicles, airplanes, etc.

Within the indicator housing 4 which is attached to the base or frame 2 by screws 42' passed through the flange 44 and seated in the base or frame 2, is the indicating mechanism designated in a general way by reference character 45, for translating the turning moment of the beam 35 into terms of the load in pounds or other suitable units. In accordance with the preferred construction shown, the beam is balanced after the load is applied by elongation of the indicator spring 46 and consequent increase of the tension of said spring, the elongation of the spring being measured to determine the load. The elongation of the spring is accomplished either by manual operation or other force applied from the outside independently of the load so that there is no error incident to work done by the load in operating the indicator and the position of the platform before and after weighing which positions are normally identical, is defined and indicated by the indicator pointer 82.

More specifically described, the indicating mechanism is as follows, see Figure 12: The beam is provided at its outer swinging end with a downwardly disposed knife edge 50 which engages a knife edge socket 51 carried by jaws 52 which straddle the end of the beam, the jaws being in the form shown carried on a block 53 which is suspended within the lower coils of the spring 46 by pin 54', see Figure 10. The upper end of the spring is similarly secured or secured in any suitable manner to a slidably movable member 55 shown in the form of a nut carried by a micrometer screw 56 which screw is supported in the upper wall of the indicator housing by a suitable thrust bearing or swivel joint 57. The screw carries at its upper end an indicator dial 5 which is marked with a scale 58 previously identified and shown in Figure 1. It will be understood that the indicator dial 5 may be turned to any desired angle relatively to the screw and secured in adjusted position by means of the split tapered mounting 59, shown in elevation, Figure 12, and in plan in Figure 1, the taper being expanded by means of an oppositely tapered screw 60. In the form shown the mounting is of upwardly decreasing cross section and the screw of downwardly decreasing cross section.

The nut or other adjustable movable member 55 engaged by the micrometer screw 56, carries secured thereto and preferably in adjustable relation a rack 61 which in the form shown operates a train of gears 62, 63, 64, 65. This train, in turn, operates the scale strip or other moving indicator scale 66 which is viewed through the window 67 in connection with the zero mark 68, Figure 13. Nut 55 has followers 55' sliding in guides 55, Fig. 11. In the form shown the bracket 69 which supports the rack 61 is secured to nut 55 by screws 71, being adjustable in the direction of the length of slots 70, and held in adjusted position by said screws 71.

With an instrument small enough to be portable and of sufficient capacity for use in inspecting trucks and passenger planes direct observation of the position of the beam which varies but slightly does not enable the operator to balance the beam with enough precision to give the desired degree or any reasonable degree of accuracy in weighing the heavy loads encountered in the inspection of road vehicles, transport planes and the like. An imperceptible variation of the beam from balance would give a large percentage of error. To avoid this difficulty a balance indicator is provided in combination with the arrangement of beam described which indicator multiplies the motion of the beam and magnifies the deflections of the beam from balanced position and hence serves to determine the balanced position with extreme accuracy.

Figure 7:
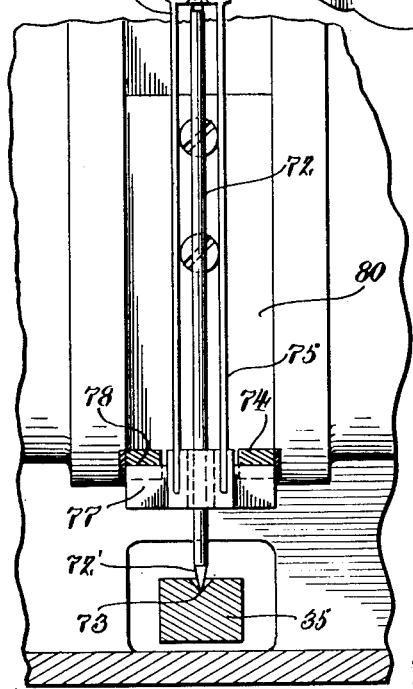
Figure 7 is a fragmentary view of the pressure transmitting thrust pin with the yoke and knife edges, the parts being shown in elevation, and the scale beam in section on line 7, 7 in Figure 4.
Figure 8:
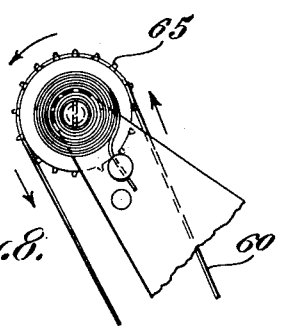
Figure 8 is a fragmentary view of the indicator scale belt and cooperating parts.
Figures 12, 13:
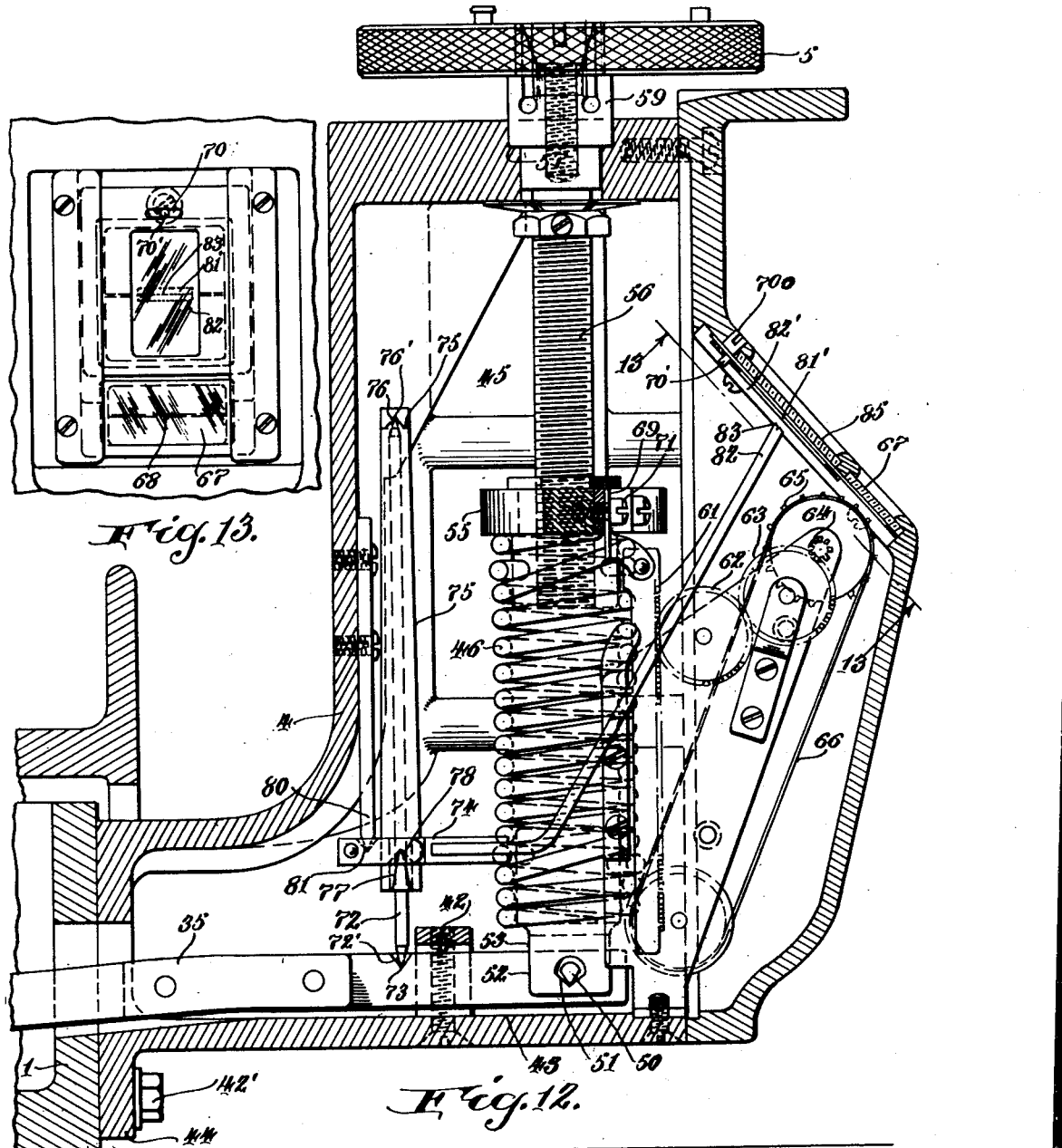
Figure 12 is a central vertical section on the line 12, 12 in Figure 2, the parts within the housing being shown in elevation.
Figure 13 is a fragmentary elevation of the indicator glass and frame as seen from the right in Figure 12, and along the line 13, 13.

The balance indicator lever 74, Figure 12, is so connected to the beam 35 as to receive the vertical motion of the beam end, and to translate the motion of the beam into the motion of the indicator pointer 82 which is moved by said lever in exact proportion to the motion of the beam without error due to lateral deflection of the beam. To this end there is a pointed thrust pin 72 the lower pointed end 72' of which engages a pointed pin socket 73 in the top of the beam 35 and this pin extends upwardly for several inches passing through the indicator lever 74 which is horizontal. The pin 72 engages at its upper end the cross arm of a depending yoke 75, Figure 7, which cross arm contains a pin socket 76 to receive the upper pointed end 76' of said pin. This yoke in turn carries transverse knife edges 77 which are upwardly disposed, engaging knife edge sockets 78 in the lever arm which are downwardly disposed so that the yoke supports the indicator lever at a point slightly spaced from the fulcrum thereof. This fulcrum is shown in the form of a downwardly disposed knife edge 80, Figure 12, which engages an upwardly disposed knife edge socket 81 in the indicator lever 74. This indicator lever 74 in turn carries the indicator pointer 82, see particularly Figure 10 which in the form shown is deflected upwardly from the lever 74 at an angle approaching 60 degrees to the horizontal so that in balanced position the indicator point or line in the end of said pointer at 83 directly underlies the balance indicator mark 81' which is on the under side of the window 85, being preferably formed on a thin transparent plate 82' at the back of the glass 85. The universal mounting of the pin at its upper and lower ends together with the yoke 75 which suspends the knife edge 77 by which the motion of the beam is transmitted to the indicator pointer in predetermined multiples prevents the lateral motion of the beam from having any effect on the reading and eliminates any tendency to cramping of the indicator mechanism.

The transparent plate 82 which in the form shown carries the indicator wire or hair 81', is adjustable by means of an eccentric 700 carrying an eccentric pin 70', see Figures 12 and 13.

In the operation of the scale the parts are first adjusted so that the zero of the scale 66 in the no load position of the platform underlies the zero mark 68 on the window 67 and the balance indicator point 83 in the end of the balance indicator pointer 82 likewise underlies the zero point 81' in the window 85 and the zero mark on the dial indicator scale 58, Figure 1, points directly at the zero mark or stationary point 5'. The load to be weighed is then placed on the platform, the weighing beam 35 or end thereof within the indicator housing being thereby depressed into contact with the floor 43 of the indicator housing. This will result in deflecting the pointer 82 to the bottom of the window 85 so that the scale is obviously out of balance. The beam is then balanced and the indicator pointer 82 is brought back to the balance indicator mark by rotating the indicator head or dial 5, turning the micrometer screw 56 until the tension of the spring 46 balances the beam and the load on the platform, at which point the pointer 82 will be in exact registration with the balance indicator mark 81'. The micrometer screw 56 is graduated to read in the minimum unit which in this instance is pounds and the revolution counter in units of 250 pounds, so that each turn of the screw 56 gives a change of tension of spring 46 equal to a change of load on the platform of 250 pounds.

The reading of the band scale 66 is then taken, it being understood that a point on this scale between two graduations 66', Figure 9, will probably register with the zero mark 68, Figure 13. If this is the case, the lower reading is taken, following which the dial scale 58 is read for the remaining portion of the load which will be less than 250 pounds, and this reading is added to the reading taken from the indicator strip which gives the exact load in terms of pounds or other units to which the scale is graduated. In this connection it will be understood that the graduations on the scale 66 are in the form shown separated by spaces representing units of 250 pounds and a single revolution of the dial 5 represents a change of balance corresponding to 250 pounds, but any suitable calibrations may be shown to suit the manufacture of the scale.

One of the advantages of the scale is that it weighs the load in the same position of the levers which they occupied in the "no load" position, so that there is no correction for angularity and the indicating operation is performed entirely by forces applied from without. In the form shown this is a manual operation, though any available power may be used. In any event, no portion of the work which might be done by the load is used in operating the indicator so that there is no correction for indicating loss, and further, there being no deflection of the beam from zero position or balanced position in weighing, and no deflection at any time beyond a deflection of $\frac{1}{32}''$, there are no frictional losses. As there are no balancing weights, there is no loss of weighing efficiency, and no loss of accuracy of the scale incident to its being out of level, the point being that there are no balance weights which would lose part of their effect due to the resolution of forces, which error would be multiplied many times in weighing.

It is also of interest that the deflection of the balancing spring 46 incident to balancing the beam 35 is in the preferred form measured directly by the motion of the device whereby the spring is elongated and translated directly into terms of the load so that there is no chance for error at this point. Also, the entire device is of such a nature that it is capable of transportation and adapted to be made so light that it can be handled by one man without great effort and moved from a side car or automobile and placed on the road surface or other suitable surface to receive the wheels of the vehicle to be weighed, and it is so accurate that it can be used for all purposes in determining the exact load down to a very small margin so that it is well adapted for use in weighing the loads applied to airplanes which under the present laws are very precisely limited. Under these laws the difference between the weights of two individual passengers is a matter to be determined with accuracy in keeping the load within the requirements. This can be done with the apparatus of the invention with the greatest precision and dispatch, as it approaches closely in its standard of accuracy the standard of accuracy required of stationary platform scales, and it has the advantage of easy and complete portability.

While the term tension has been applied to the force used deflecting the spring to balance the beam, it will be understood that the spring may be located in any suitable manner and deflected by shortening or elongating in balancing the beams.

The scale has been described as manually portable and having a single platform of single wheel width, and this is the most convenient form.

In weighing wheeled vehicles a single scale unit may be placed in line with the wheels on one side and a dummy in line with the wheels on the other side, the scale and dummy being in line transversely to the path of the vehicle and spaced in accordance with the spacing of the wheels. The front wheels may be then run on to the platform and dummy, respectively, and the scale readings taken. A corresponding rear wheel may then be weighed in the same way, it being understood that either the front or the rear wheel may be weighed first, and to weigh the wheels on the other side the scale and the dummy, which is a block corresponding in size and particularly in height to the scale, are reversed in position and the wheels on the other side are weighed. To weigh two wheels at once, two scales spaced in accordance with the spacing of the wheels may be used and the front wheels and then the rear wheels or vice versa, are weighed in pairs, the computation of the total weight being made in an obvious manner. The tire bearing pressure per unit of tire width may be computed for each wheel by weighing that wheel and computing. In weighing airplanes, either one, two or three instruments may be used. If one is used, the other two would be dummies or supporting blocks, the wheels being weighed successively and the load would be computed in a manner corresponding to that just described, i. e., by adding the readings of all the wheels of the vehicle.

I have thus described specifically and in detail a portable weighing instrument embodying the features of my invention in the preferred form in order that the manner of constructing, applying and using the invention and the various features thereof may be fully understood, however, the specific terms herein are used descriptively rather than in a limiting sense, the scope of the invention being defined in the claims.

What I claim as new and desire to secure by Letters Patent is:

1. A platform scale for use in weighing wheeled vehicles, the same being of single wheel width and of such size and weight as to be manually portable, the scale consisting of a platform, a weighing beam supporting the platform and having a supporting fulcrum near one end of the beam beneath the platform, means by which a force proportionate to the weight on the platform is communicated to the beam at a point spaced from the fulcrum in the direction of the length of the beam, said means comprising reducing levers, a balancing resilient means engaged with the end of the beam remote from the fulcrum, means for limiting the motion of the beam, holding the beam substantially in balanced position and the platform substantially stationary during loading and weighing, an indicator pointer, multiplying means separate from the beam and separately mounted, and connected to the beam at a point remote from the fulcrum, said pointer being operated by said multiplying means and being moved thereby in widely multiplied ratio to the motion of the beam for indicating the balanced position of the beam before and after loading the platform, means operable by an external force to apply stress to the resilient means, thus deflecting the resilient means to return the beam to balanced position after placing the load on the platform and in opposition to said load, and means for measuring the deflection of the resilient means when the beam is thus returned to balanced position and indicating the same in terms of the load.

2. A platform scale for use in weighing wheeled vehicles, the same being of single wheel width and of such size and weight as to be manually portable and comprising a platform, a weighing beam supporting the platform and having a supporting fulcrum, means by which a force proportionate to the weight on the platform is communicated to the beam at a point spaced from the fulcrum in the direction of the length of the beam, a balancing spring remote from the fulcrum and means operable in opposition to the weight on the platform for applying stress to the spring to balance the beam in opposition to the load, means for limiting the motion of the beam so that it moves but a small fraction—approximately $\tfrac{1}{32}$ of an inch—from balanced position, multiplying means separate from the beam and separately mounted and connected to the beam remotely from the fulcrum thereof to be operated thereby for multiplying the motion of the beam, and an indicator operated by said multiplying means for indicating the balanced position of the beam which is identical before and after loading, and means for measuring the deflection of the spring when the beam is balanced after loading to determine the load, one end of the spring being connected to the beam and the other end of the spring being connected to said stress-applying means, to be moved in balancing the beam, a moving indicator connected to the moving end of the spring opposite to the end attached to the beam to move in proportion to the motion of said end of the spring in balancing the beam, and a stationary scale mark cooperating with said indicator to read the deflection of the spring in terms of the load.

3. A platform scale for use in weighing wheeled vehicles, the same being of single wheel width and manually portable, the scale comprising a platform to receive and support the wheel and on which the wheel is run in weighing, a weighing beam, a fulcrum support for the beam and means communicating the weight on the platform to the weighing beam in reduced proportion thereto at a point slightly spaced from the fulcrum in the direction of the length of the beam, and means for indicating the balanced position of the beam, comprising an indicator lever pivoted adjacent the beam, at a point which is widely spaced in the direction of the length of the beam from the point of application of the weight, a thrust pin having a point engaging the beam, a yoke supported on the upper end of said pin which is also pointed, a knife edge carried by said yoke, the indicator lever being supported on said knife edge, said indicator lever having a fulcrum on one side of said knife edge and a relatively elongated indicating arm on the other side of said knife edge, an indicator point with which a corresponding point on the indicator arm registers in the balanced position of the beam, which position is both the unloaded position and the weighing position of the beam, a balancing spring connected to the beam adjacent said thrust pin, means for limiting the motion of the beam preventing any considerable deflection from balanced position, externally operable means for applying tension to the spring and thus deflecting the spring to balance the beam, and indicator means being connected to the end of the spring remote from the beam and movable in direct proportion to the motion of said end in balancing the beam to indicate the deflection of the spring in the balanced position of the beam in terms of the load.

4. A platform scale comprising a platform, a weighing beam, a supporting fulcrum therefor and means communicating the weight on the platform to the weighing beam in reduced proportion thereto and at a point on the beam slightly spaced from the fulcrum, means for indicating the balanced position of the beam comprising an indicator lever pivoted adjacent the beam at a point remote from the fulcrum, a thrust pin at right angles to the beam and having a point engaging the beam, a yoke pivotally supported on the said pin at a point remote from the beam, a knife edge carried by said yoke, the indicator lever being supported on said knife edge, said indicator lever having a fulcrum on one side of said knife edge and a relatively elongated indicating arm on the other side of said knife edge, an indicator point with which a corresponding point on the indicator arm registers in the balanced position of the beam in no load and in weighing position, a balancing spring engaged at one end with the beam adjacent said thrust pin, means for limiting the motion of the beam so as to maintain it substantially in balanced position at all times, externally operable means for applying tension to the spring at a point thereon remote from the beam, and thus deflecting the spring to balance the beam, and indicator means connected to the spring near the point of application of tension thereto and operating in direct proportion to the motion of said point of application in balancing the beam, said indicator means being readable in terms of the load in the balanced position of the beam.

5. A platform scale, the scale comprising a platform, a weighing beam having a supporting fulcrum and means communicating the weight on the platform to the weighing beam at a point near said fulcrum and in reduced proportion thereto, an indicator lever pivoted adjacent the beam at a point remote from the fulcrum, and widely spaced in the direction of the length of the beam from the point of application of weight, a thrust pin at right angles to the beam pivotally engaging the beam near said latter end, a yoke pivotally supported on said pin at a point remote from the beam, a knife edge carried by said yoke, the indicator lever being supported on said knife edge, said indicator lever having a fulcrum on one side of said knife edge and a relatively elongated indicating arm projecting on the other side of said knife edge, an indicator point with which a corresponding point on the indicator arm registers in the balanced position of the beam under no load and in weighing, a balancing spring connected to the beam adjacent said thrust pin, means for closely limiting the motion of the beam so as to maintain it substantially in balanced position at all times, externally operable means engaging the spring at a point spaced away from the beam for applying stress to the spring and thus deflecting the spring to balance the beam, and means connected to the spring to move in proportion to the deflection of the spring as tension is applied thereto in balancing the beam, said indicator means being calibrated to indicate the deflection of the spring in terms of the load on the platform, and means carried by the stress applying means for reading the deflection of the spring in smaller units between the scale marks of the first mentioned indicator, and means for adjusting all of said indicating means in their relation to the spring.

6. In a manually portable platform scale for weighing a single wheel of a wheeled vehicle, a scale beam, a supporting fulcrum therefor, means for applying the load on the platform to the scale beam at a point near the fulcrum but slightly spaced therefrom in the direction of the length of the beam and in reduced proportion to the actual load, a spring for balancing the beam, the same being engaged with the beam at a point remote from the fulcrum, means for limiting the motion of the beam so that it moves but a small fraction of an inch from balanced position, the platform remaining substantially stationary in loading and weighing, multiplying means separate from the beam and separately mounted and connected to the beam remotely from the fulcrum to be operated thereby, said multiplying means comprising a swinging lever having a short arm connected to the beam and a relatively long arm, and a pointer operated by said long arm for indicating the balanced position of the beam in weighing and means for applying an outside force to the spring in opposition to the load to balance the load by deflecting the spring and means for reading the deflection of the spring in the balanced position of the beam in terms of the load.

7. In a manually portable scale adapted for use in weighing single wheels of wheeled vehicles and the like, a scale beam, a supporting fulcrum therefor, means for applying the load to the beam at a point adjacent but spaced from the fulcrum in the direction of the length of the beam, a spring for balancing the beam, the same being engaged with the beam at a point remote from the point of application of the load, means for applying a force to the spring independently of the load and in opposition to the load, the force being applied to the spring at a point remote from its engagement with the beam, thereby deflecting the spring, and means connected to said force supplying means and movable therewith to measure the deflection of the spring in balancing the beam to determine the load, and multiplying indicating means mounted separately from the beam and connected thereto, multiplying the motion of the beam, for indicating the balanced position of the beam in no load and in weighing position, said position in both instances being identical, and means for limiting the motion of the beam whereby the beam is held at all times substantially in balanced position.

8. In a portable platform scale for road vehicles having a platform, a beam with a fulcrum supporting the same, the combination of a resilient member connected to the beam to balance the beam in loaded and unloaded condition, means for closely limiting the motion of the beam so that it remains substantially in balanced position, a multiplying balance indicator connected to the beams remotely from the fulcrum to be operated by the movement of the beam to indicate the position and balance of the beam, and means for distorting the resilient member to balance the beam in opposition to the load comprising a micrometer screw and a dial carried thereby, the same being calibrated to read in units of weight and a counter connected to the screw to interpret the number of revolutions of the screw in larger units of weight, the bulk of the weight of heavy loads being indicated by the counter to which the dial figures are added to give the complete reading.

9. In a portable platform scale for road vehicles having a platform, a beam with a fulcrum supplying the same, the combination of a resilient member connected to the beam to balance the beam in loaded and unloaded condition, means for closely limiting the motion of the beam so that it remains substantially in balanced position, a multiplying balance indicator connected to the beam remotely from the fulcrum to be operated by the movement of the beam to indicate the position and balance of the beam and means for distorting the resilient member to balance the beam in opposition to the load comprising a micrometer screw and a dial carried thereby, the same being calibrated to read in units of weight and a counter connected to the screw to interpret the number of revolutions of the screw in larger units of weight, the bulk of the weight of heavy loads being indicated by the counter to which the dial figures are added to give the complete reading, and means for adjusting the dial and the counter relatively to the screw.

10. In a manually portable scale for weighing vehicles having a platform of single tire width and a scale beam supporting the platform, means for limiting the motion of the beam to an arc of approximately one-sixteenth of an inch and hence the motion of the platform to substantially ½ of .001", a multiplying device for indicating the balanced position of the scale beam comprising an indicator lever separate from the beam and pivotally mounted and having an elongated indicator arm with a pointer at its swinging end, said lever being adjacent a point on the scale beam remote from its fulcrum, means connecting the indicator lever near its pivot to the scale beam at said remote point, and a normally stationary indicator mark with which the pointer registers in the balanced position of the scale beam, resilient means for balancing the beam in opposition to the load, means for varying the balancing force of the resilient means and means for indicating said variation in terms of the load.

KENNETH E. WHITNEY.